(12) United States Patent
Al-Ghamdi et al.

(10) Patent No.: US 6,981,821 B2
(45) Date of Patent: Jan. 3, 2006

(54) SUBSEA PIPELINE INSERTION SHOE

(75) Inventors: Saleh Ubaid Al-Ghamdi, Ras Tanura (SA); James Bradford, Tanajib Marine (SA); Abdulrahman A. Al-Mudadil, Tanajib Marine (SA)

(73) Assignee: Saudi Arabian Oil Company, Dhahran (SA)

( * ) Notice: Subject to any disclaimer, the term of this patent is extended or adjusted under 35 U.S.C. 154(b) by 34 days.

(21) Appl. No.: 10/444,328

(22) Filed: May 22, 2003

(65) Prior Publication Data

US 2004/0234341 A1 Nov. 25, 2004

(51) Int. Cl.
*F16L 55/105* (2006.01)
*F16L 55/11* (2006.01)
*B08B 7/00* (2006.01)

(52) U.S. Cl. .............. 405/184.1; 405/154.1; 405/158.1; 405/170; 138/92; 138/94; 138/97; 15/104.03

(58) Field of Classification Search ............. 405/154.1, 405/157, 158, 170, 184.1; 138/92, 94; 15/104.03, 15/104.05, 104.061
See application file for complete search history.

(56) References Cited

U.S. PATENT DOCUMENTS

| | | | | |
|---|---|---|---|---|
| 1,517,677 A | * | 12/1924 | Heinkel | 138/92 |
| 3,154,106 A | * | 10/1964 | Ver Nooy | 138/94 |
| 3,512,554 A | | 5/1970 | Childers | 137/15 |
| 3,788,084 A | * | 1/1974 | Matthews, Jr. | 405/173 |
| 5,333,649 A | | 8/1994 | Shimokawa et al. | 138/89 |
| 5,924,436 A | | 7/1999 | Kitani et al. | 137/15 |
| 5,927,319 A | | 7/1999 | Burkhalter | 137/268 |
| 6,109,829 A | * | 8/2000 | Cruickshank | 405/169 |
| 6,241,424 B1 | * | 6/2001 | Bath et al. | 405/156 |
| 6,289,935 B1 | * | 9/2001 | Tash | 138/94 |
| 6,776,184 B1 | * | 8/2004 | Maichel et al. | 138/94 |

FOREIGN PATENT DOCUMENTS

EP 890776 * 1/1999

* cited by examiner

*Primary Examiner*—Jong-Suk (James) Lee
(74) *Attorney, Agent, or Firm*—Abelman, Frayne & Schwab

(57) ABSTRACT

An insertion shoe for retrofitting an undersea pipeline to permit passage therethrough of a scraper includes a plate sized to cover an opening in a branch connection of the pipeline and an inner surface structured to match the inner surface surrounding the opening. The insertion shoe can be installed in the branch connection to protect the opening without lifting the pipeline above water, so that the scraper may pass through without becoming jammed.

20 Claims, 11 Drawing Sheets

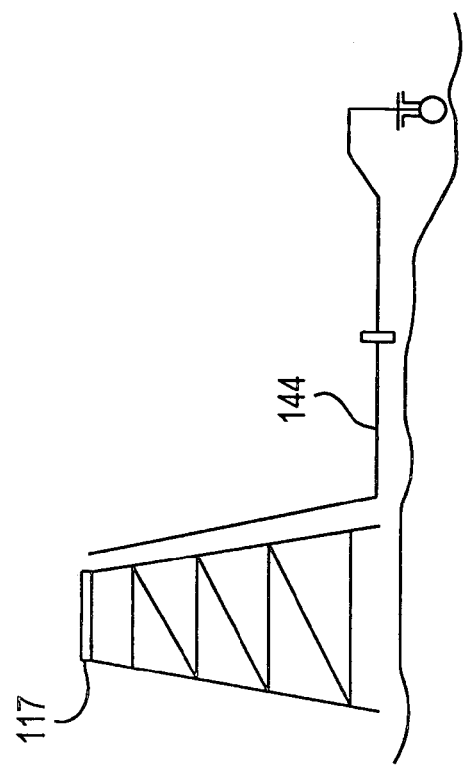
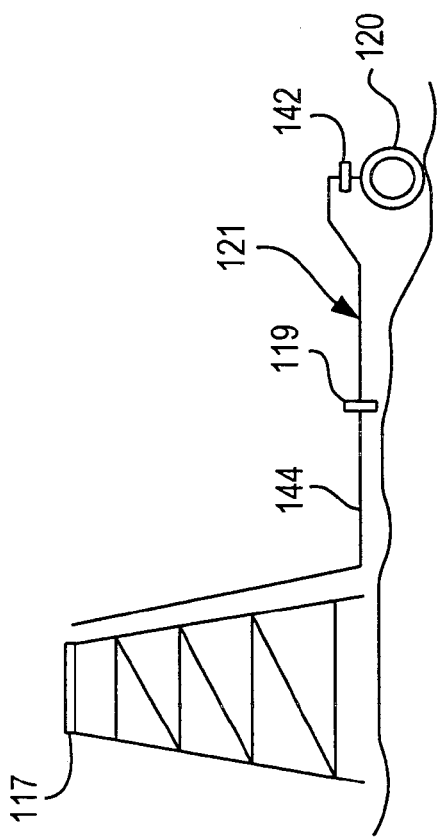
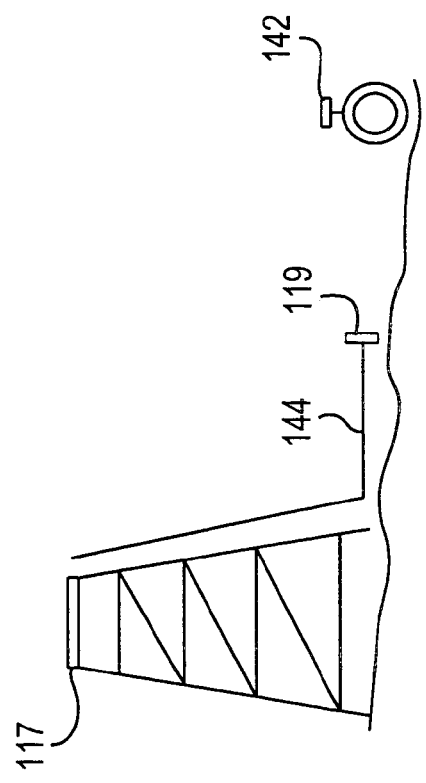

SUBSEA PIPELINE INSERTION SHOE

FIELD OF THE INVENTION

The present invention relates to the maintenance of underwater pipelines, and more particularly relates to the repair and retrofitting of branch connections to permit the passage of a pipeline scraper or the like through the pipeline without impediment.

BACKGROUND OF THE INVENTION

Underwater pipelines for oil, gas and other fluids require maintenance to keep their interior passageways clear, and for this purpose a robotic internal pipeline scraper is often used. Such a scraper is inserted at one entrance to the pipeline and is propelled to pass along the pipeline to an exit, scraping the interior sides of the passageway free from buildup as it goes.

Necessarily, in order to scrape the sides, the scraper must contact the sides with an appropriate degree of force. This operation creates a problem when the pipeline contains a branch connection, as most pipelines do. The branch connection may be in the form of a Y or T connection, but in any case the connection fitting makes an opening in the main passageway. A scraper making its way along the main passageway may turn into the opening at the branch connection and become jammed.

FIG. 1 illustrates this problem in the context of a typical pipeline scraping operation. As shown therein, a 30 inch pipeline 10 has a 24 inch tie-in T-section 12 connected therein with a corresponding opening 14 to permit passage of the conveyed liquid. An auxiliary pipeline 16 is connected to the T-section 12 by a conventional bolted flange 18. The direction of flow of the conveyed liquid is indicated by the arrow A inside the pipeline 10.

In FIG. 1, a pipeline scraper 20 has been introduced into the main pipeline 10 from the upstream direction indicated by arrow B at the left of the figure and is traveling downstream, toward the right of the figure. At a first position 22 within the pipeline 10, the scraper 20 is in contact with all interior sides of the pipeline 10 with sufficient force to be scraping those sides free of accumulated debris. However, when the scraper 20 reaches position 24, it encounters the opening 14 and may tilt into it, with the lead end 26 of the scraper 20 entering the T-section 12 and becoming jammed against the far corner 28. As a result, the pipeline 10 goes out of service and must be repaired.

The only way to repair the pipeline 10 under these conditions is to flush the pipeline 10 and then send one or more divers underwater to locate the jammed connection and lift the pipeline 10 itself onto a work barge, where the jammed scraper 20 can be removed by cutting out the section containing the fouled fitting and putting an appropriately configured new branch fitting in its place. The pipeline 10 can then be reclosed and deposited back under the sea. Needless to say, this is a very expensive operation and has considerable associated environmental risks.

Other robotic devices, such as monitoring devices, are also used to traverse the pipelines and may similarly become jammed at the branch openings.

The use of scrapers and such other devices is a relatively new development as compared with the age of certain existing pipelines that are still in service. Their use can enhance and extend the useful life of older pipelines, but this was not contemplated when the older pipelines were put in place.

Now that the use of scrapers has become more common, pipeline fittings are provided with the necessary guards or longitudinally extending bars that will preclude the entry of the scraper into the opening into the branch line. It would be highly desirable to retrofit the existing pipelines with such guard bars over the branch openings, but the only way currently known for doing so involves the pipeline lifting operation described above, making it prohibitively expensive to engage in any general overhaul.

Moreover, in many cases trunk lines cross under or over other trunk lines, flow lines, power lines and/or communication cables, so that individual trunk lines often cannot be lifted to the surface without wholesale disruption of the entire pipeline system.

Consequently, while retrofitting is highly advantageous, it is possible in accordance with conventional techniques only in limited circumstances and only at great expense.

OBJECTS AND SUMMARY OF THE INVENTION

Accordingly, it is an object of the present invention to provide a method for repairing pipeline branch connections that avoids the above-described difficulties of the prior art.

It is a further object of the present invention to provide a method that avoids the prior art difficulties in retrofitting pipeline branch connections to avoid future pipeline jams requiring repair.

It is another object of the present invention to provide a structure that may be used for such repair and retrofitting that may be connected in the pipeline without requiring the pipeline to be raised to the surface.

In accordance with these and other objects, a method is provided for retrofitting an undersea pipeline to permit passage therethrough of a device, wherein the pipeline includes a main pipeline having an interior first passageway through which the device is intended to pass and a branch fitting defining an interior second passageway in fluid communication with the first passageway through a first opening in the branch fitting, the branch fitting having a second opening from the second passageway spaced from the first passageway. The branch fitting further has a first inner surface defining a continuation of the first passageway surrounding the first opening at which the device may become jammed, and a connecting structure initially connecting the branch fitting to a branch pipeline through the second opening.

The method then comprises the steps of, without lifting the main pipeline above water, disconnecting the branch pipeline from the connecting structure of the branch fitting to expose the second opening, inserting an insertion shoe through the second opening into the first opening, the insertion shoe including a plate sized to cover the first opening and having a second inner surface structured to match the first inner surface when the insertion shoe is installed, and installing the insertion shoe in the first opening such that the plate covers the first opening and the second inner surface matches the first inner surface so that the device may pass through the first passageway and past the installed insertion shoe without becoming jammed.

In one embodiment, when it is desired to seal off the first opening permanently and no longer use the branch pipeline, the plate of the insertion shoe is without openings, so that fluid conveyed through the first passageway cannot pass out of the main pipeline past the insertion shoe.

In another embodiment, when the branch pipeline is to continue in use but it is desired to protect the first opening against jamming, the plate of the insertion shoe is provided with openings, so that fluid conveyed through the first passageway can pass out of the main pipeline past the insertion shoe into the second passageway, and the method further comprises the step of attaching either the original branch pipeline or a new one to the connecting structure after the insertion shoe is installed.

These and other objects, features and advantages of the present invention will become apparent from the following detailed description of the preferred embodiments, taken together with the attached drawings.

BRIEF DESCRIPTION OF THE DRAWINGS

FIG. 4 is a schematic view of the connection of the main pipeline to an auxiliary pipeline through a dropout spool.

FIG. 5 is a schematic view of the arrangement of FIG. 4 after the dropout spool has been disconnected.

FIG. 14 is a schematic view of the arrangement of FIG. 4 after the insertion shoe has been installed and a dropout spool reconnected.

DETAILED DESCRIPTION OF THE PREFERRED EMBODIMENTS

Figure 2:
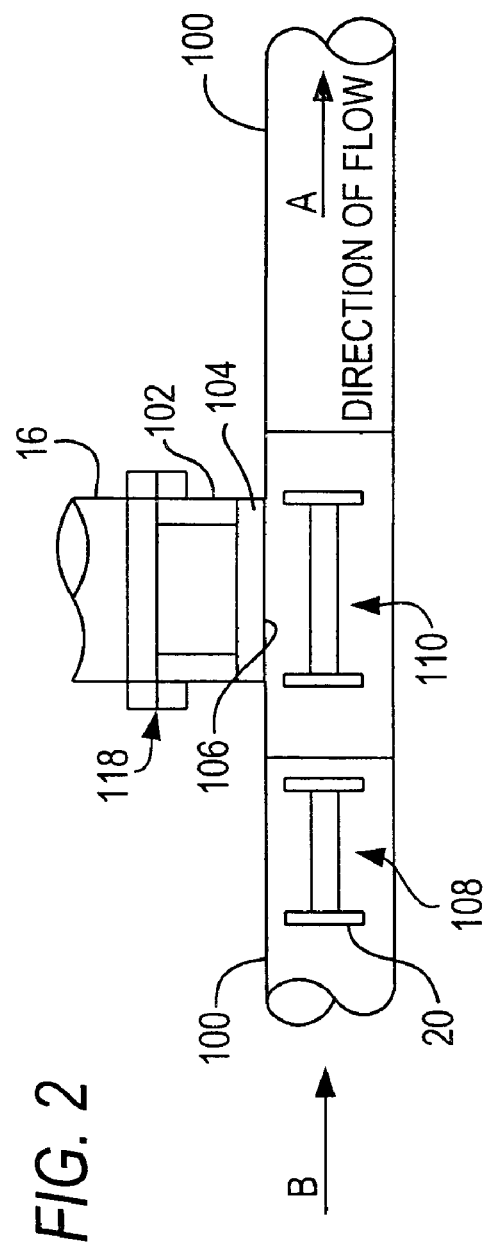
FIG. 2 is a schematic illustration of a scraper passing successfully past a branch connection opening protected by an underwater pipeline branch insertion shoe in accordance with a preferred embodiment of the present invention.

FIG. 2 illustrates the successful passage of a scraper 20 through a pipeline 100 that has been retrofitted in accordance with the present invention.

Figure 1:
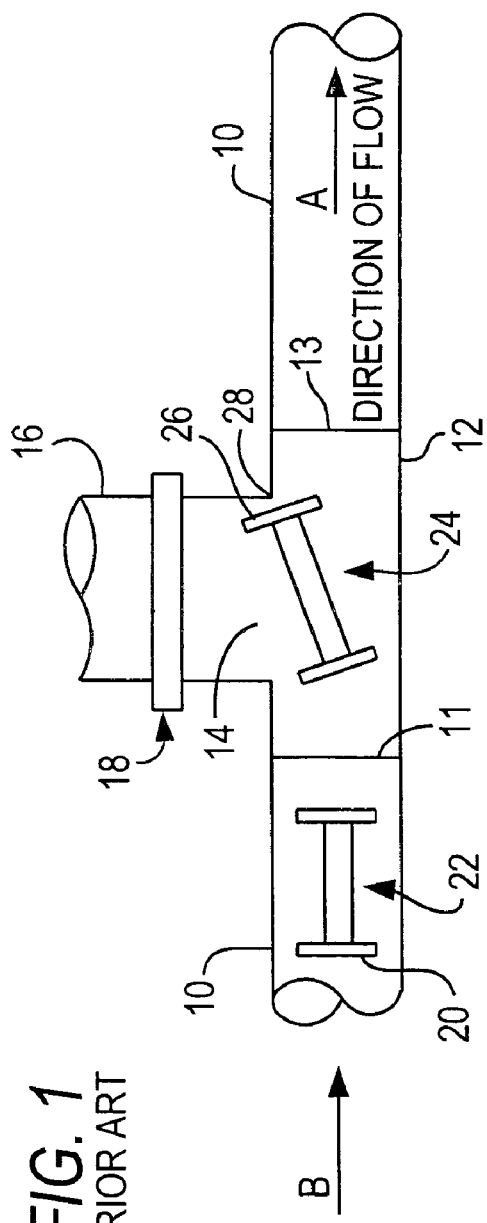
FIG. 1 is a schematic illustration of a scraper becoming jammed in an undersea pipeline having an unprotected branch connection opening.

Pipeline 100 is a conventional 30 inch diameter pipeline and has a conventional 24 inch diameter branch connection tee fitting 102, with an opening 106 into the vertical portion of the fitting 102 and a flange 118 connecting the fitting 102 to an auxiliary pipeline 16, just as in FIG. 1. Now, however, an insertion shoe 104 in accordance with a preferred embodiment of the present invention has been installed to protect the opening 106 and permit passage of the scraper 20 from a first, upstream position 108 to a second position 110 past the opening 106 without jamming.

In accordance with an advantageous aspect of the present invention, it is possible to install the insertion shoe 104 without lifting the pipeline 100 above the surface.

Figure 3:
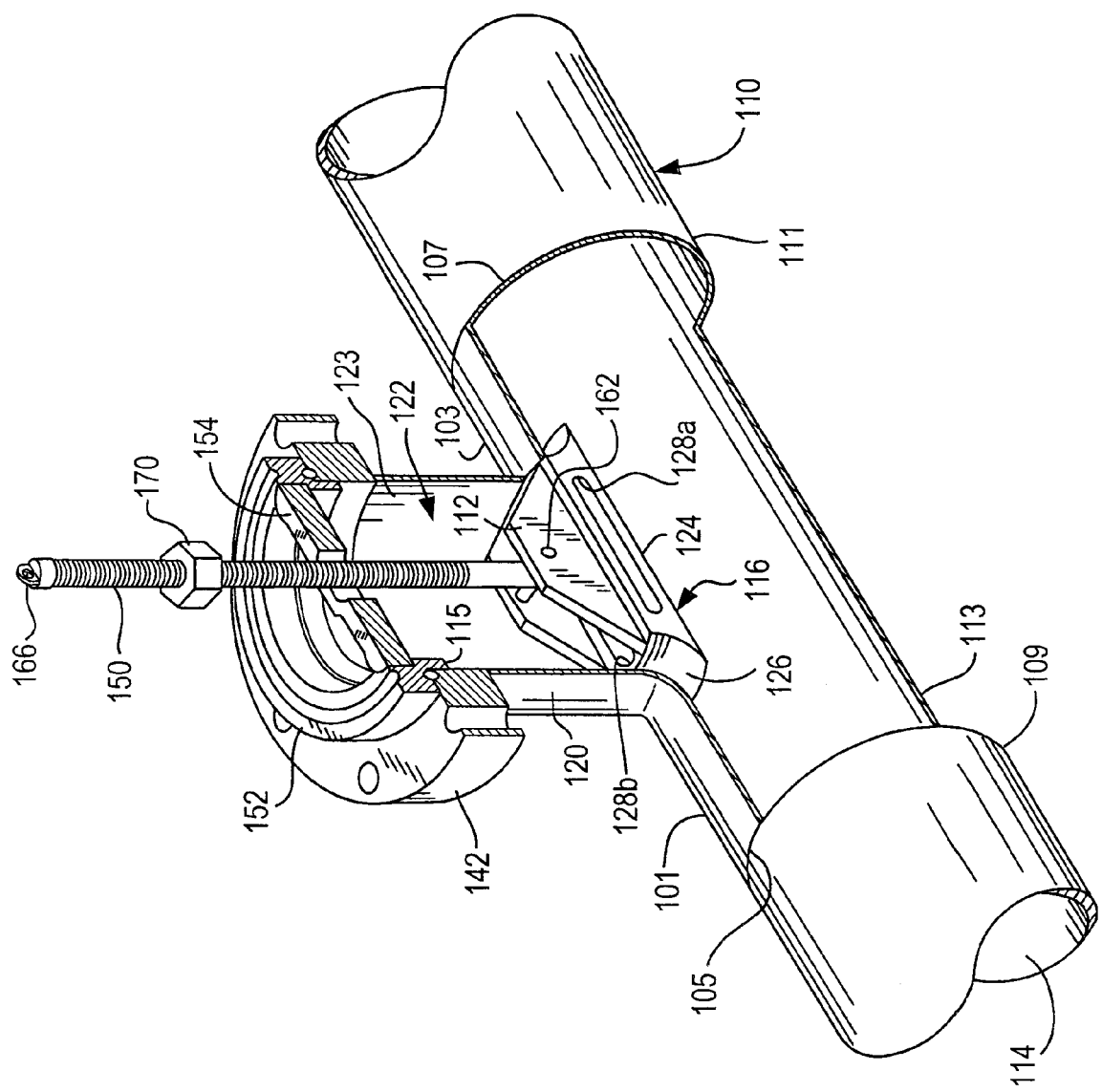
FIG. 3 is a partial cross-section/cutaway view of a preferred embodiment of an insertion shoe in accordance with the present invention.

A preferred embodiment of such an insertion shoe is illustrated in FIG. 3, which is a partial cross-section/cutaway view of a so-called "open" insertion shoe 112 installed to protect the main pipeline 100. As shown in cutaway in FIG. 3, the pipeline 100 has an open interior passageway 114 through which the gas or oil is intended to flow and whose inner surface is to be scraped. In this example, a branch connection or fitting in the form of a T-section 120 is used although other branch connections such as Y-sections may also be employed within the scope of the present invention.

As is conventional, the opposed ends 101, 103 of the horizontal portion 113 of the T-section 120 are welded at respective seams 105, 107 to first and second portions 109, 111 of the main pipeline 100 to define a continuous passageway. Thus, the passageway 114 of the pipeline 100 proper leads into and is continuous with the horizontal portion 113 of the T-section 120.

It will of course be understood that the terms "horizontal" and "vertical" as used herein are intended merely to define two different directions of flow through a main pipeline and out to a branch pipeline, and that different, or even non-perpendicular, orientations may occur within the scope of the present invention.

In the absence of the insertion shoe 112, the horizontal portion 113 is open at an opening 116 to a second interior passageway 122 in the vertical section 123 of the T-section 120. This second passageway 122 has a second opening 115 spaced from the first passageway 114. The T-section 120 further has a conventional flange 142 that surrounds the second opening 115 and functions as a connecting structure for connecting the T-section 120 to feed into an auxiliary pipeline 144.

In conventional practice, the T-section 120 does not attach directly to the auxiliary pipeline 144. Rather, as shown in FIG. 4, the auxiliary pipeline 144 extends from, for example, a remote well platform 117 and is connected by a conventional link 119 to a dropout spool 121 which in turn is connected to the flange 142. In the illustrated structure, the dropout spool 121 includes a conventional flange that can be bolted to the flange 142. It is well known that the dropout spool 121 can be readily disconnected (unbolted) from the link 117 and/or the flange 142 by divers under water without having to raise this section of pipeline to the surface. FIG. 5 shows the setup of FIG. 4 with the dropout spool 121 disconnected from the flange 144 to permit installation of an insertion shoe in accordance with the present invention through the opening 115.

In the present application, the term "branch pipeline" will refer to whatever pipe element extends from the branch fitting, whether it be a dropout spool, an auxiliary pipeline or other element.

Referring back to FIG. 3, the insertion shoe 112 includes a curved plate 124 sized to cover the opening 116. In this embodiment, the outer perimeter 126 of the plate 124 fits tightly into the opening 116 against the inner surface 127 of the horizontal portion 113 of the T-section 120 at the opening 116 to block the flow of the conveyed liquid at the circumference 126. Thus, the insertion shoe 112 fits into the opening 116 like a liquid-tight plug.

Figure 6:
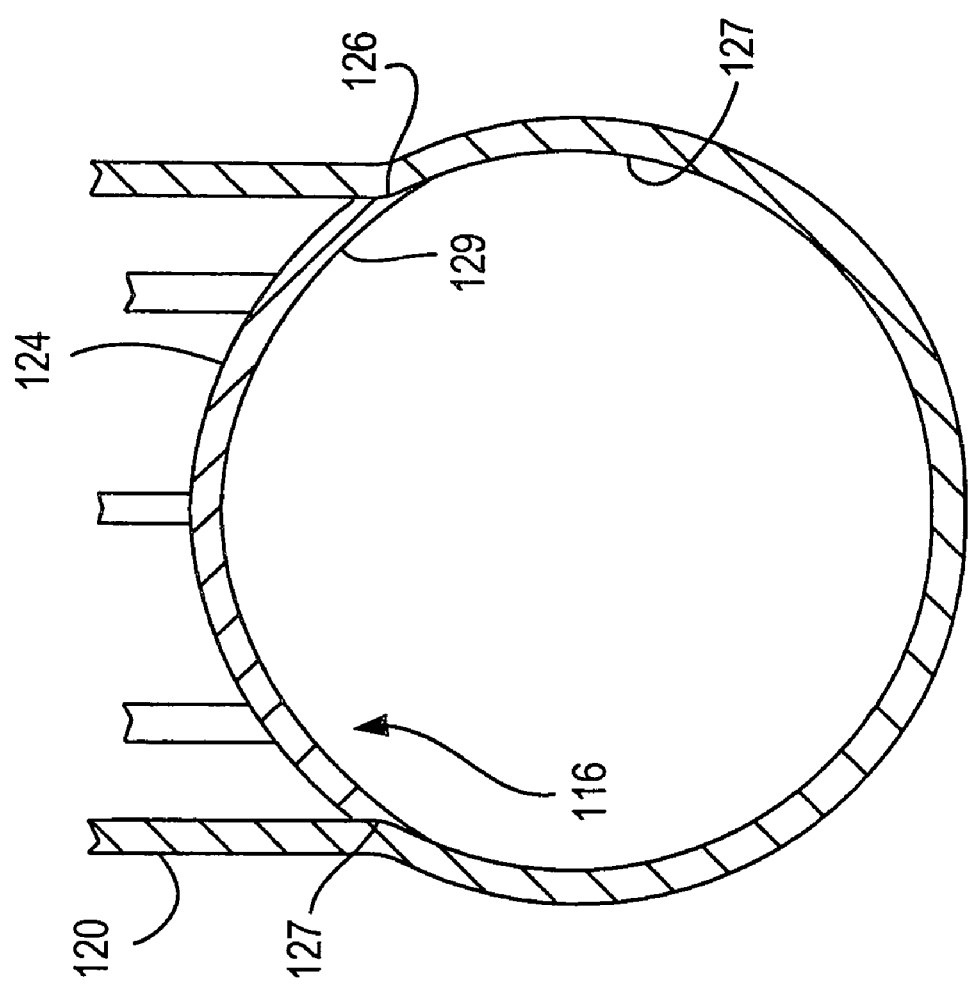
FIG. 6 is a semi-schematic side cross-sectional view of the insertion shoe of FIG. 3.

This feature is shown semi-schematically in cross-section in FIG. 6, which also illustrates that the horizontal portion 113 of the T-section 120 is circular in cross-section, matching a corresponding cross-section of the main pipeline 100. The scraping device 20 will have a matching circumference, so that it can scrape off debris along the inner surface 127 and along the inner surface of the main pipeline 100. To permit passage of the scraping device 20, the plate 124 of the insertion shoe 112 has an inner surface 129 that matches the inner surface 127 of the T-section 120. In this example, the inner surface 127 is circular and the inner surface 129 of the plate 124 completes the circle. It will be understood, however, that the relevant inner surface of any insertion shoe in accordance with the present invention can have whatever shape is appropriate in order to match the shape of the branch connection and the main pipeline in use so as to accommodate the scraper 20 or other traveling device.

Because the insertion shoe 112 is an open insertion shoe, it includes one or more openings, such as side opening 128a and top opening 128b, through which the conveyed liquid may flow from the main pipeline 100 to the auxiliary pipeline 144. Therefore the open insertion shoe 112 is suitable for use when the auxiliary pipeline 144 is to remain in use after the retrofitting operation.

Figure 7:
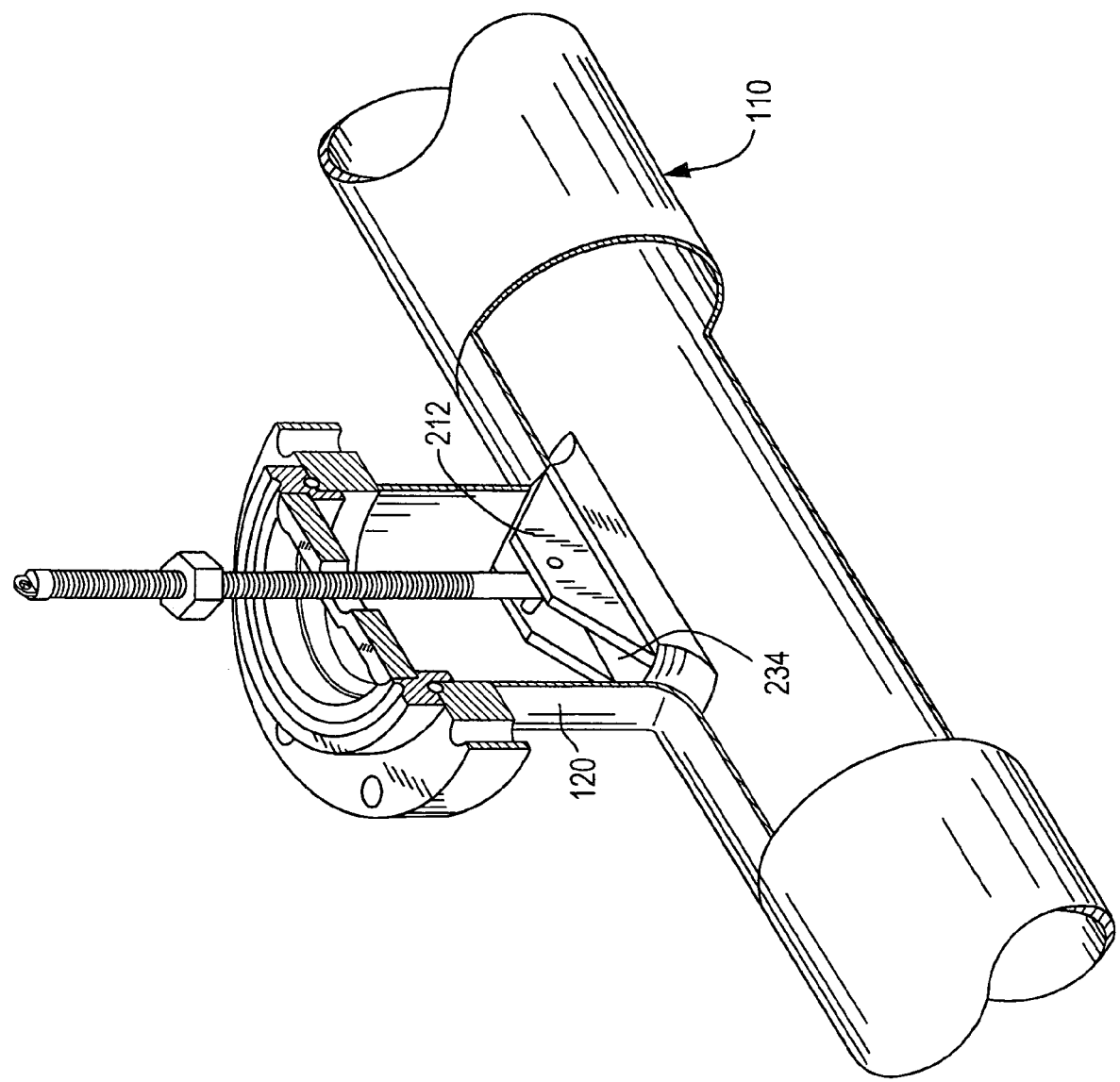
FIG. 7 is a partial cross-section/cutaway view of another preferred embodiment of an insertion shoe in accordance with the present invention.

As discussed below, the present operation also contemplates so-called "closed" embodiments wherein the insertion shoe is without openings, so that the opening 116 to the auxiliary pipeline 144 is completely blocked. Upon installation of such a closed insertion shoe, the auxiliary pipeline 144 may be scraped. In general, the only difference between an open insertion shoe and a closed insertion shoe in accordance with the present invention will be the presence or absence of such openings, and an example of such a closed insertion shoe 212 is illustrated in FIG. 7 as being identical to the open insertion shoe 112 except for having no openings in the plate 234. Therefore the description of any features in the various openings in the plate 234. Therefore the description of any features in the various embodiments other than such openings is applicable to both types of insertion shoe.

Figure 8:
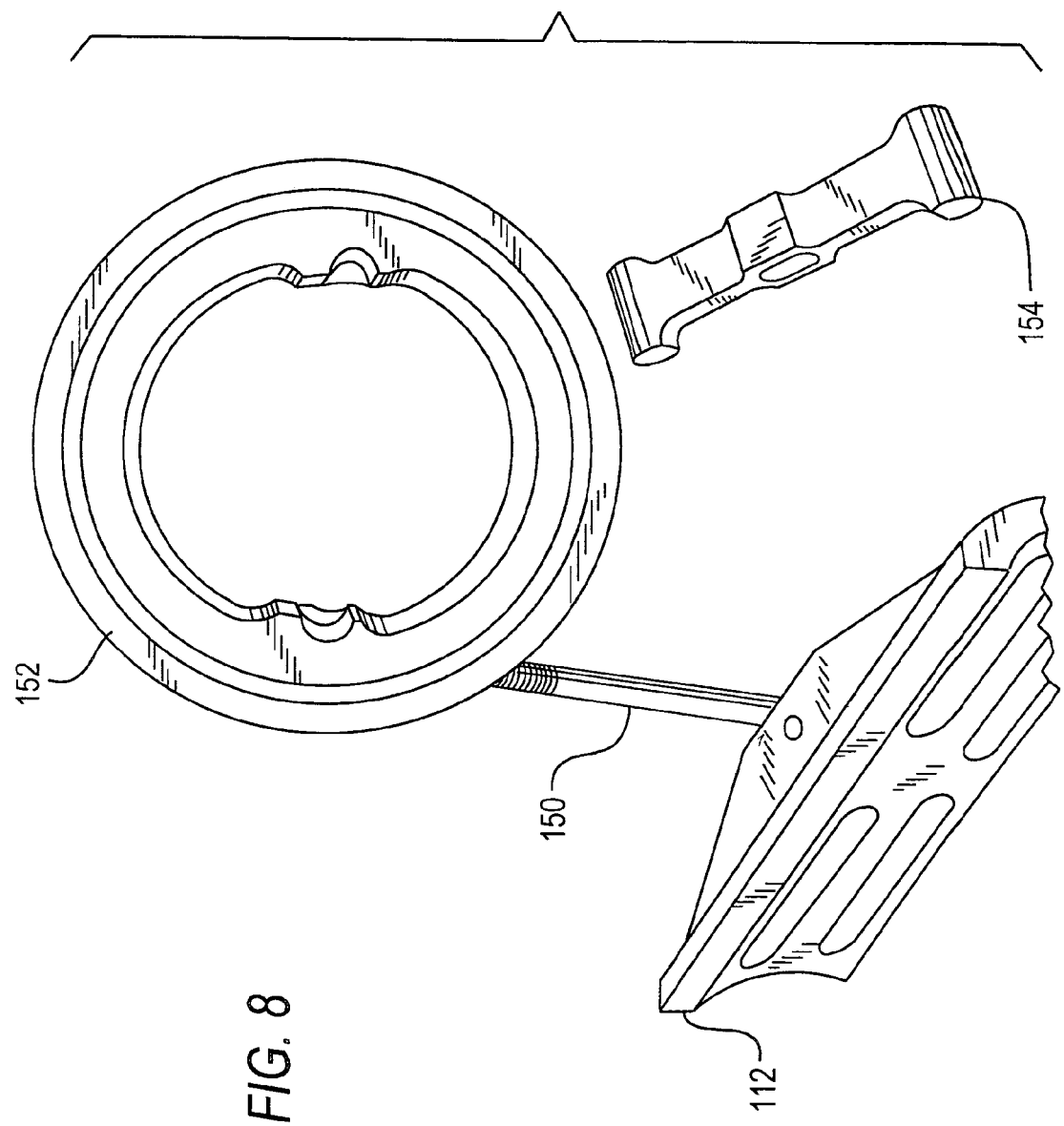
FIG. 8 is a perspective view of the insertion shoe of FIG. 3 and its accompanying insertion sleeve and lock bar.
Figure 10:
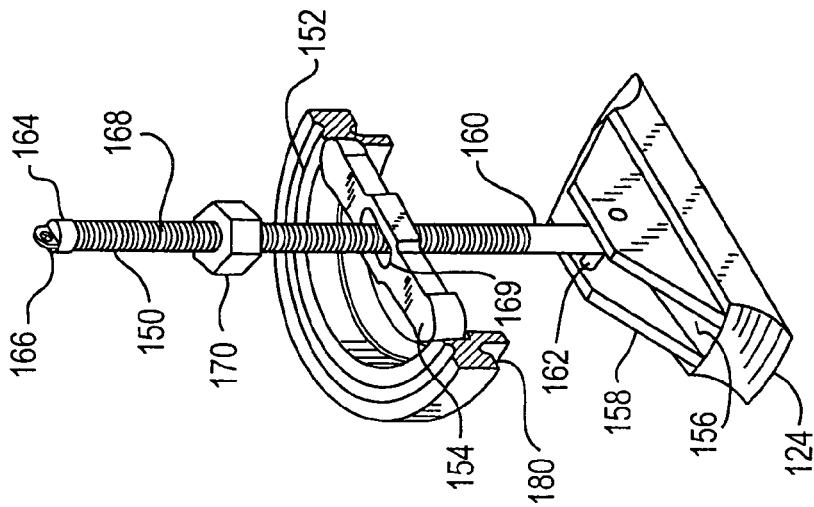
FIG. 10 is a partial cutaway view showing the insertion shoe of FIG. 3 in a final position.
Figure 9:
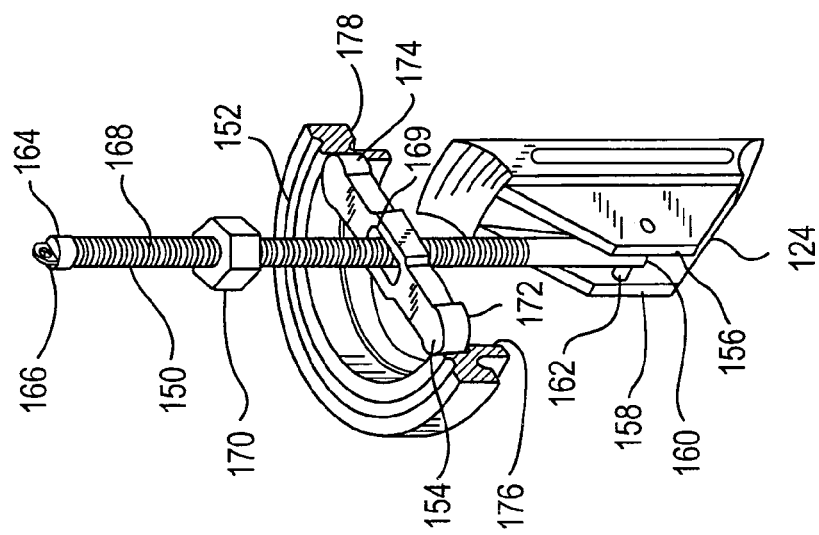
FIG. 9 is a partial cutaway view showing the insertion shoe of FIG. 3 in a first position.

The insertion shoe 112 of FIG. 3 includes a structure for connecting the insertion shoe 112 to the T-section 120, including a main guide rod 150, and insertion sleeve 152 and a lock bar 154. FIG. 8 is a perspective view of the insertion shoe 112, the insertion sleeve 152 and the lock bar 154, and FIGS. 9 and 10 are elevational views of the insertion shoe 112 in first and final positions for installation. As shown in FIGS. 9 and 10, the insertion shoe 112 includes opposed side panels 156, 158 that extend upwardly from the plate 124 and are sized to fit in the vertical portion 123 of the T-section 120. The lower end 160 of the guide rod 150 is connected between the side panels 156, 158 on a pivot pin 162, so that the plate 124 can pivot. FIG. 9 illustrates the insertion shoe 112 with the plate 124 pivoted to a vertical first position in which it may be inserted through the opening 115 into the vertical portion 123 and then through the opening 116 into the horizontal portion 113. FIG. 10 illustrates the insertion shoe 112 with the plate 124 pivoted to the final horizontal position, also shown in FIG. 3, for fitting as a plug into the opening 116.

The top end 164 of the guide rod 150 includes a lifting eye 166 for manipulating the guide rod 150 to lower the insertion shoe 112 into position. The guide rod 150 also has an external threading 168 for receiving a locking nut 170.

The lock bar 154 includes a central opening 169 through which the guide rod 150 extends, with the central opening 169 being small enough to block passage of the locking nut 170. The opposed ends 172, 174 of the lock bar 154 are shaped to fit into respective depressions 176, 178 in the insertion sleeve 152. As shown in FIG. 9, the depressions 176, 178 have a defined depth and the lock bar 154 is generally uniform in thickness to match the depth of the depressions 176, 178. The insertion sleeve 152 is shaped with a lower external surface 180 (see FIG. 10) to fit onto the flange 142 of the T-section 120.

Figure 11:
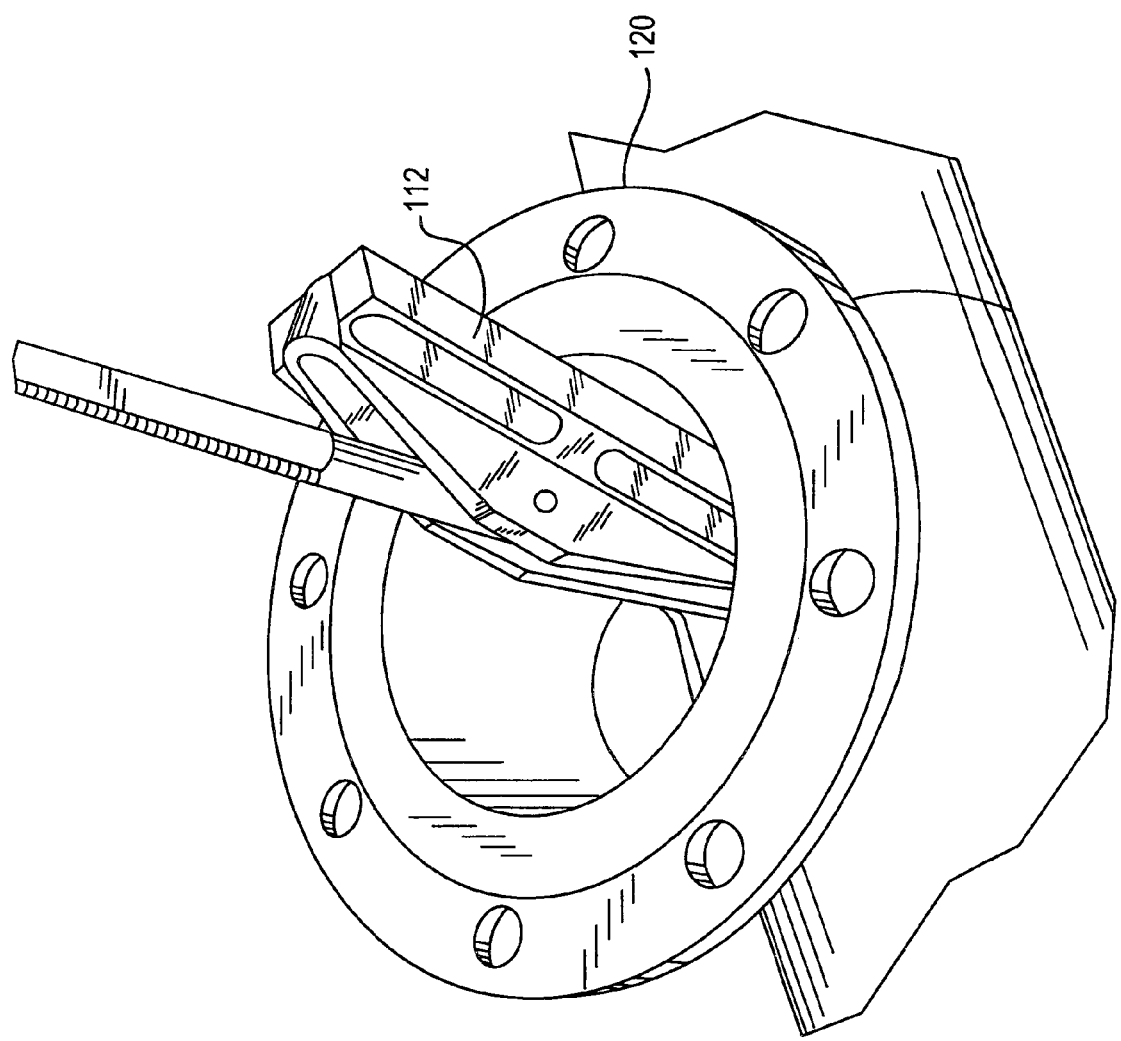
FIG. 11 is a perspective view of the insertion shoe of FIG. 3 being inserted into a model of the branch connection.
Figure 12:
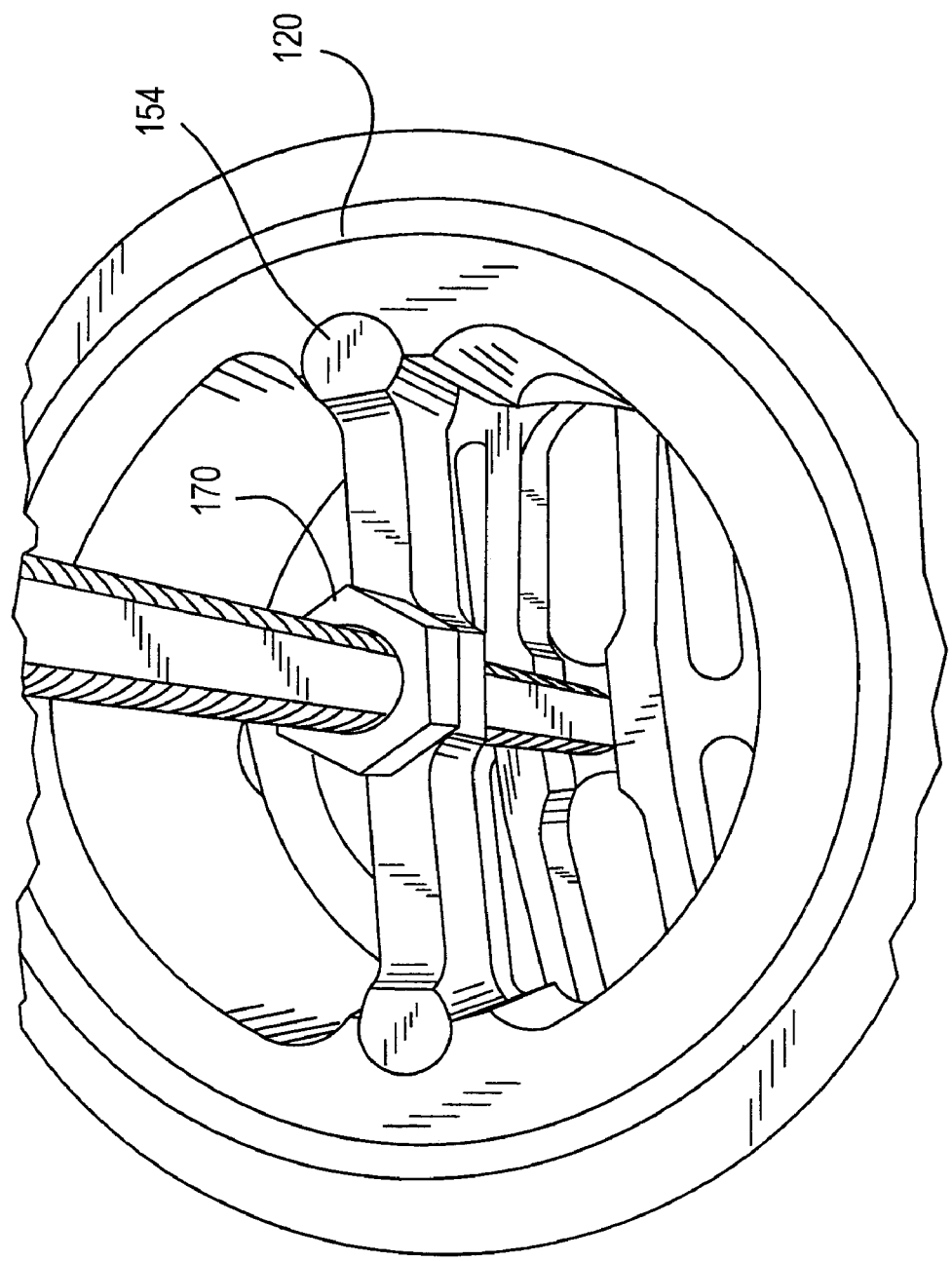
FIG. 12 is a top perspective view of the insertion shoe of FIG. 3 as installed in the model of the branch connection.
Figure 13:
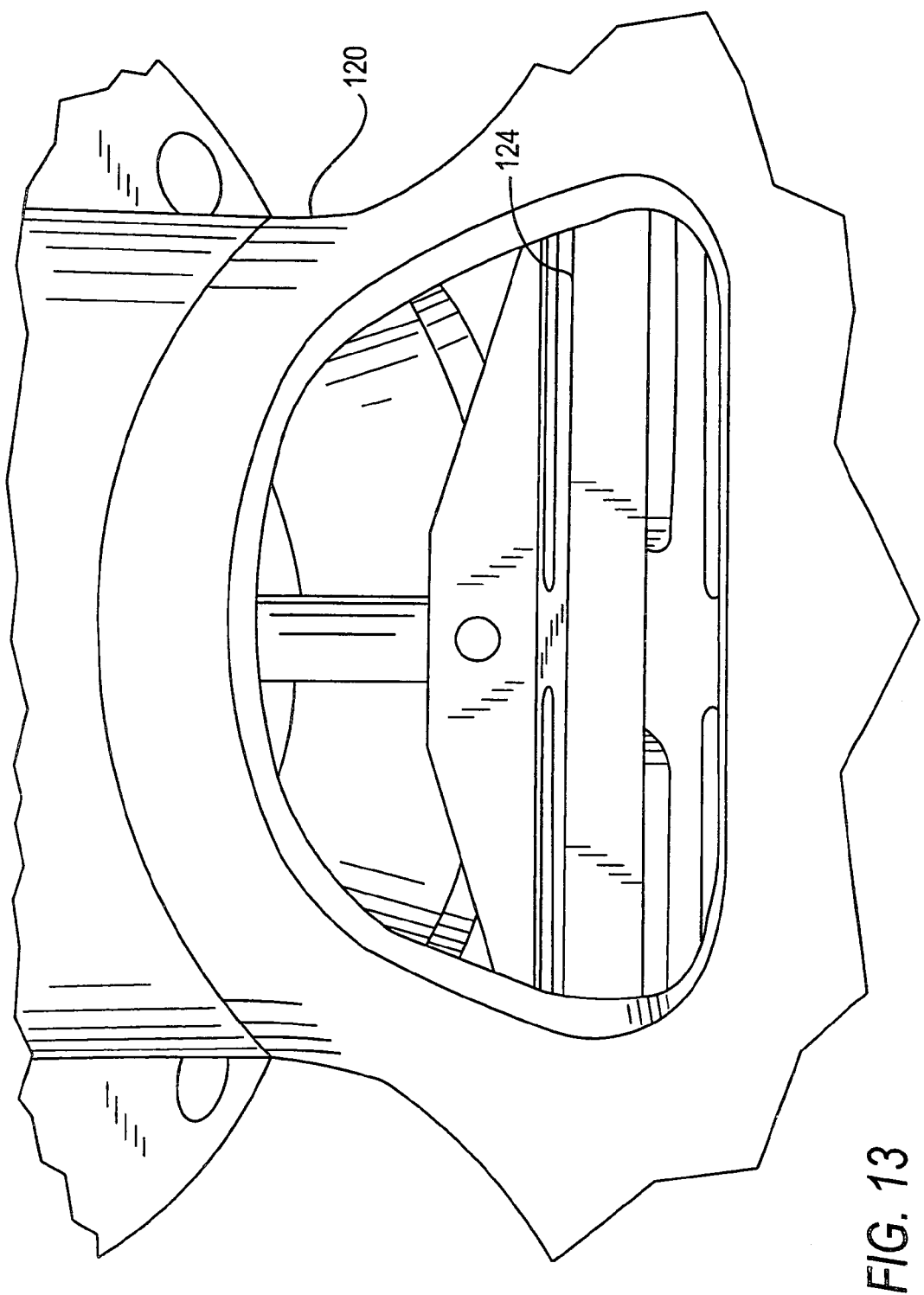
FIG. 13 is a side perspective view of the insertion shoe of FIG. 3 as installed in the model of the branch connection.

To install the insertion shoe 112, the plate 124 is pivoted into its first (vertical) position and is lowered, using the guide rod 150 as a handle, through the opening 115 and the opening 116 into the horizontal portion 113 of the T-section 120. FIG. 11 is a perspective view of the insertion shoe 112 being inserted into the T-section 120. First the flange 142 and then the walls of the vertical portion 123 will keep the plate 124 from pivoting to horizontal during this process. However, once the plate 124 is in the horizontal portion 113, it will naturally return to a horizontal position and can be drawn upwardly by the guide rod 150 to fit into the opening 116. The insertion sleeve 152 is then fitted onto the flange 142 and the central opening 168 of the lock bar 154 slipped over the top end of the guide bar 154, so that the ends 172, 174 fit into the depressions 176, 178. Finally, the locking nut 170 is screwed down the guide bar 150 as far as possible to bring the plate 124 into its tightly fitting position in the opening 116. The plate 124 pressing against the inner surface 127 of the T-section 120 prevents the insertion shoe 112 from moving upwardly, and the locking nut 170 pressing against the lock bar 154 prevents the insertion shoe 112 from moving downwardly. FIGS. 12 and 13 are respectively top and side perspective views of the insertion shoe 112 after it has been installed. Thus, the insertion shoe 112 is quickly and easily installed.

In order to install an insertion shoe in accordance with any of the embodiments of the present invention, the following procedure is effected. First the pipeline as shown in FIG. 4 is shut down and flushed to remove any residual oil or other conveyed fluid. Then one or more divers descend to the branch point in place to unbolt and remove the dropout spool connected to the branch connection of the main pipeline, as shown in FIG. 5. If a closed insertion shoe is desired, the divers install the shoe into the branch connection and the site is demobilized.

After installing an open insertion shoe, on the other hand, the divers reconnect the dropout spool (or connect a new one) as shown in FIG. 14, so that flow within the main and auxiliary pipelines can be resumed with the insertion shoe in place.

In either case, the main pipeline can now be scraped without the possibility of fouling.

It will of course be apparent to those of ordinary skill in the art that other types of connection structures for connecting the insertion shoe to the branch connection and/or main pipeline may be employed as appropriate for a particular application within the scope of the present invention.

Figure 15:
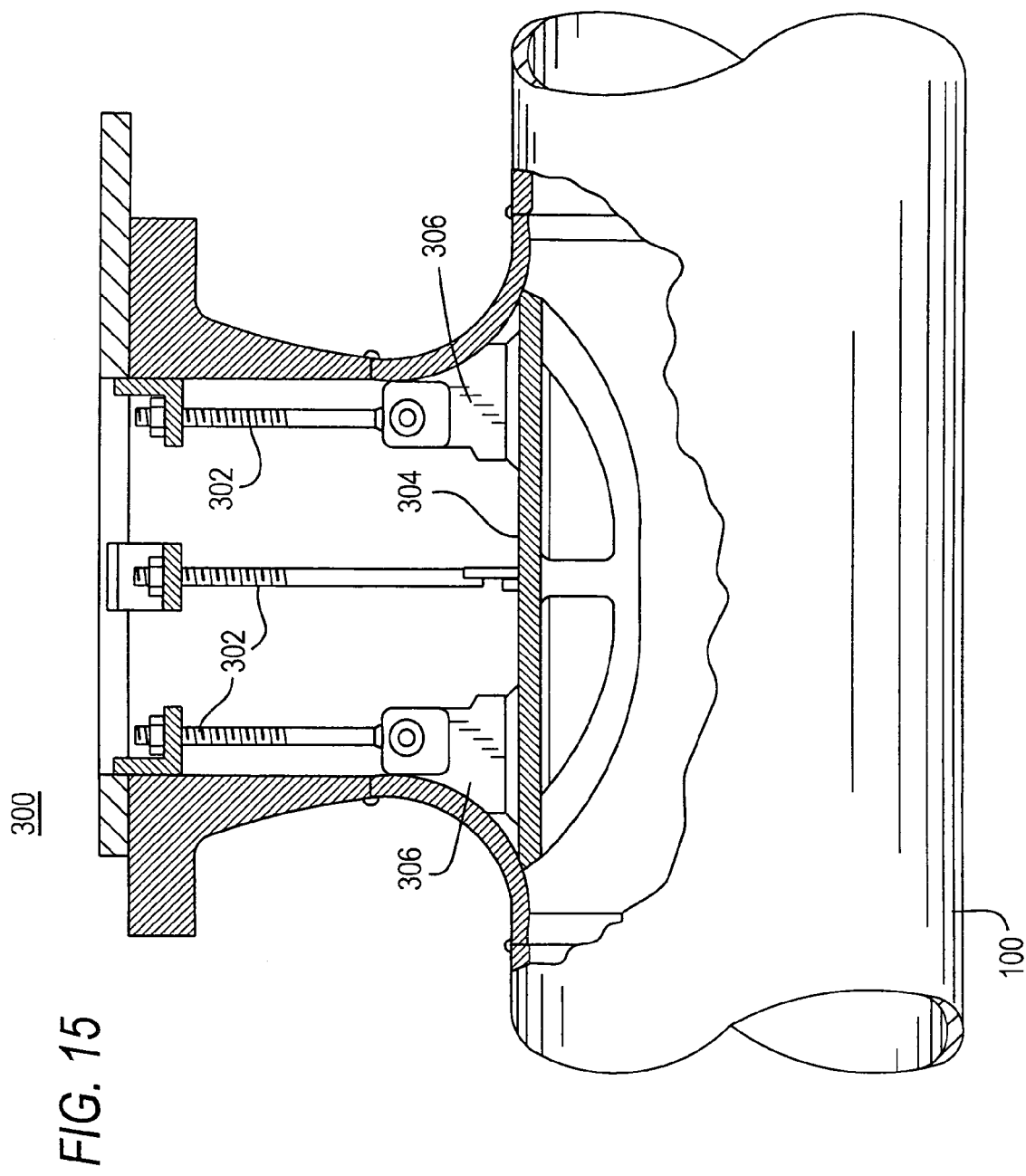
FIG. 15 is a partial cross-section/cutaway view of yet another preferred embodiment of an insertion shoe in accordance with the present invention.

For example, the plate of the insertion shoe might be connected to a T-section by one or more connection bars. FIG. 15 illustrates an embodiment 300 using four such connection bars 302 fixed to the plate 304 and welded to brackets 306 on the T-section 308. In an alternative embodiment, the connection bars can be welded onto the T-section itself or other structure.

While the disclosed method and apparatus have been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A method of retrofitting an undersea pipeline to permit passage therethrough of a device, wherein the pipeline includes: a main pipeline having an interior first passageway through which the device is intended to pass; and a branch fitting defining an interior second passageway in fluid communication with the first passageway through a first opening in the branch fitting, the branch fitting having a second opening spaced from the first passageway, the branch fitting further having a first inner surface defining a continuation of the first passageway surrounding the first opening at which the device may become jammed, and a connecting structure initially connecting the branch fitting to a branch pipeline through the second opening, said method comprising the steps of, without lifting the main pipeline above water: disconnecting the branch pipeline from the connecting structure of the branch fitting to expose the second opening; inserting an insertion shoe through the second opening into the first opening, the insertion shoe including a plate sized to cover the first opening and having a second inner surface structured to match the first inner surface when the insertion shoe is installed; and installing the insertion shoe in the first opening such that the plate covers the first opening and the second inner surface matches the first inner surface so that the device may pass through the first passageway and past the installed insertion shoe without becoming jammed.

2. The method of claim 1, wherein the plate of the insertion shoe is without openings, so that fluid conveyed through the first passageway cannot pass out of the main pipeline past the insertion shoe.

3. The method of claim 1, further comprising an initial step of flushing the main pipeline prior to disconnecting the branch pipeline.

4. The method of claim 1, wherein the branch pipeline is a drop out spool connected between the branch fitting and a platform tie-in line.

5. The method of claim 1, wherein the plate of the insertion shoe is provided with openings, so that fluid conveyed through the first passageway can pass out of the main pipeline past the insertion shoe into the second passageway, said method further comprising the step of attaching a connecting pipeline to the connecting structure after the insertion shoe is installed.

6. The method of claim 5, wherein the branch pipeline is a drop out spool connected between the branch fitting and a platform tie-in line.

7. The method of claim 5, wherein the connecting pipeline is a dropout spool.

8. The method of claim 5, wherein the connecting pipeline is the dropout spool previously disconnected from the connecting structure.

9. The method of claim 1, wherein the connecting structure is a flange connection, and wherein said disconnecting step comprises unbolting the auxiliary pipeline from the flange connection.

10. The method of claim 1, wherein the branch fitting is a T-section.

11. An insertion shoe for retrofitting an undersea pipeline to permit passage therethrough of a device, wherein the pipeline includes a main pipeline having an interior first passageway through which the device is intended to pass, and a branch fitting defining an interior second passageway in fluid communication with the first passageway through a first opening in the branch fitting, the branch fitting having a second opening spaced from the first passageway, the branch fitting further having a first inner surface defining a continuation of the first passageway surrounding the first opening at which the device may become jammed, and a connecting structure initially connecting the branch fitting to a branch pipeline through the second opening, said insertion shoe comprising: a plate sized to cover the first opening; a second inner surface structured to match the first inner surface when said insertion shoe is installed in the branch fitting; and an installation structure for manipulating said insertion shoe via the second opening and through the first opening without lifting the main pipeline above water and for positioning said insertion shoe such that said plate covers the first opening and the second inner surface matches the first inner surface so that the device may pass through the first passageway and past the installed insertion shoe without becoming jammed.

12. The insertion shoe of claim 11, wherein said plate is without openings, so that fluid conveyed through the first passageway cannot pass out of the main pipeline past said insertion shoe.

13. The insertion shoe of claim 11, wherein said plate is provided with openings, so that fluid conveyed through the first passageway can pass out of the main pipeline past said insertion shoe into the second passageway.

14. The insertion shoe of claim 11, wherein said installation structure includes a guide bar to which said plate is pivotally connected.

15. The insertion shoe of claim 14, wherein said plate is pivotable on said guide bar to a first position wherein said plate presents a first cross-section that fits through the second opening, and wherein said plate is pivotable on said guide bar to a final position wherein said plate presents a second cross-section that does not fit through the second opening.

16. An insertion shoe adapted for at least partially sealing an undersea pipeline, wherein the pipeline includes a main pipeline having an interior first passageway, and a branch fitting defining an interior second passageway in fluid communication with the first passageway through a first opening in the branch fitting, the branch fitting having a second opening associated with the second passageway and spaced from the first passageway, the branch fitting further having a first inner surface defining a continuation of the first passageway surrounding the first opening, and a connecting structure initially connecting the branch fitting to a branch pipeline through the second opening, said insertion shoe comprising: a plate sized to cover at least a portion of the first opening; a second inner surface structured to match the first inner surface when said insertion shoe is installed in the branch fitting; and an installation structure for manipulating said insertion shoe via the second opening and through the first opening without lifting the main pipeline above water and for positioning said insertion shoe such that said plate covers the first opening and the second inner surface matches the first inner surface.

17. The insertion shoe of claim 16, wherein said plate is without openings.

18. The insertion shoe of claim 16, wherein said plate is provided with openings.

19. The insertion shoe of claim 16, wherein said installation structure includes a guide bar to which said plate is pivotally connected.

20. The insertion shoe of claim 19, wherein said plate is pivotable on said guide bar to a first position wherein said plate presents a first cross-section that fits through the second opening, and wherein said plate is pivotable on said guide bar to a final position wherein said plate presents a second cross-section that does not fit through the second opening.

* * * * *